Figure 1:
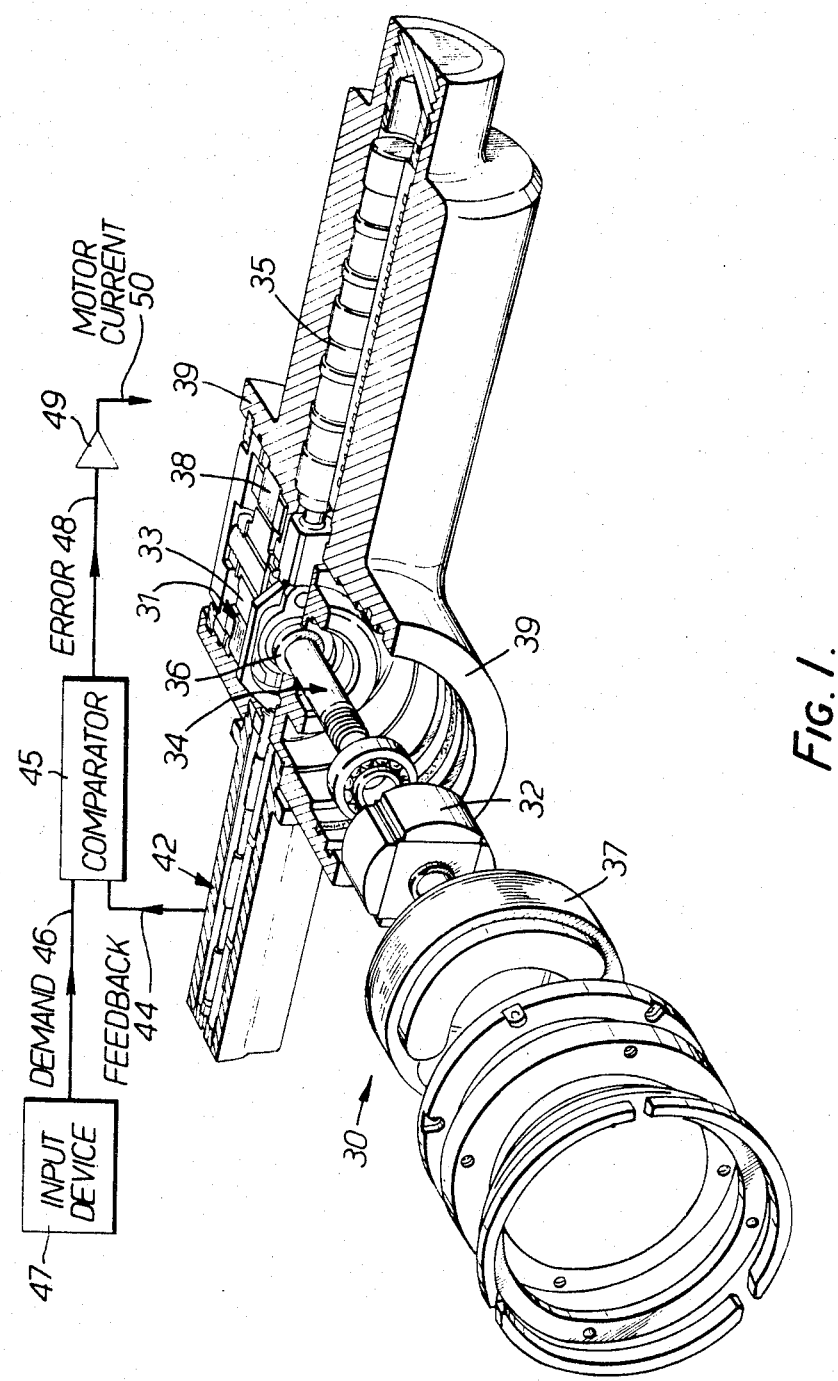

United States Patent [19]

Avery

[11] Patent Number: 4,535,263

[45] Date of Patent: Aug. 13, 1985

[54] ELECTRIC D.C. MOTORS WITH A PLURALITY OF UNITS, EACH INCLUDING A PERMANENT MAGNET FIELD DEVICE AND A WOUND ARMATURE FOR PRODUCING POLES

[75] Inventor: Robert W. Avery, Blagdon, England

[73] Assignee: Fairey Hydraulics, Ltd., England

[21] Appl. No.: 422,903

[22] PCT Filed: Jan. 25, 1982

[86] PCT No.: PCT/GB82/00019

§ 371 Date: Sep. 13, 1982

§ 102(e) Date: Sep. 13, 1982

[87] PCT Pub. No.: WO82/02619

PCT Pub. Date: Aug. 5, 1982

[30] Foreign Application Priority Data

Jan. 23, 1981 [GB] United Kingdom ............... 8102022

[51] Int. Cl.³ ..................... H02K 7/20; H02K 37/00
[52] U.S. Cl. ................... 310/112; 310/49 R; 310/156
[58] Field of Search ............ 310/112, 192, 190, 191, 310/193, 116, 49 R, 80, 154, 156, 254; 318/721, 799; 335/272

[56] References Cited

U.S. PATENT DOCUMENTS

| | | | |
|---|---|---|---|
| 3,644,763 | 2/1972 | Skrobisch | 310/36 |
| 3,693,034 | 9/1972 | Inariba | 310/49 |
| 3,895,278 | 7/1975 | Picunko | 318/421 |
| 3,979,652 | 9/1976 | Faxon | 310/112 |
| 4,009,406 | 2/1977 | Inariba | 310/40 MM |
| 4,246,528 | 1/1981 | Nakajima | 318/721 |
| 4,330,724 | 5/1982 | Goddijn | 310/49 R |
| 4,355,249 | 10/1982 | Kenwell | 310/49 R |

FOREIGN PATENT DOCUMENTS

| | | |
|---|---|---|
| 2234011 | 1/1974 | Fed. Rep. of Germany . |
| 829726 | 7/1938 | France . |
| 267584 | 3/1927 | United Kingdom . |
| 1024515 | 3/1966 | United Kingdom . |
| 1079970 | 8/1967 | United Kingdom . |
| 1180662 | 2/1970 | United Kingdom . |
| 1315267 | 5/1973 | United Kingdom . |

Primary Examiner—Peter S. Wong
Assistant Examiner—D. L. Rebsch
Attorney, Agent, or Firm—Dressler, Goldsmith, Shore, Sutker & Milnamow, Ltd.

[57] ABSTRACT

An electric motor, such as a limited-rotation-angle type, has two or more motor units, including spaced stators enclosing respective rotors on a common shaft. Circumferential, spaced permanent magnets are mounted on the rotors. Stator windings are recessed in slots that are angularly offset with respect to adjacent stator slots. This offset angle between spaced stators is equal to the slot pitch divided by the number of motor units. As a result, the cogging, or super-imposed varying torques of each motor section that occur as the magnets pass a stator slot, are out of phase, and thus substantially cancel out.

4 Claims, 6 Drawing Figures

ELECTRIC D.C. MOTORS WITH A PLURALITY OF UNITS, EACH INCLUDING A PERMANENT MAGNET FIELD DEVICE AND A WOUND ARMATURE FOR PRODUCING POLES

This invention relates to electric motors comprising a permanent magnet field and a wound armature.

The invention is particularly applicable to a direct drive DC motor, for a servo-actuator, which may be directly attached to the load. Such a motor may have a wound armature and a permanent magnet field which acting together convert electrical currents directly into torque to maintain desired accuracy in a positioning or speed control system. If continuous rotation is required, commutation may be necessary, and this can be provided by semi-conductor switching with timing provided by a magnetic sensor mounted on the rotor. The invention is, however, particularly applicable for a motor capable of a limited angle of rotation only, for example plus and minus 20°. In this case torque is proportional to the coil current and also varies approximately sinusoidally with angle of rotation.

A problem with such an arrangement is that the slots which are provided so that the windings may be inserted provide an interruption in the magnetic circuit so that as the rotor turns (even when the coils are not energized) the changes of reluctance introduce an alternating torque which may be referred to as a cogging torque, which is superposed upon the desired torque, sometimes aiding it and sometimes opposing it. This cogging torque represents a disturbing load which has to be overcome by the applied torque arising from current in the coils. The number of such slots provided for the windings is an integral multiple of the number of poles. The slots are usually equally spaced around the motor.

Various methods have been proposed to overcome this cogging torque, for example by filling the slots with a magnetic metal (such as iron) or skewing them, but in general this involves additional expense.

According to the present invention an electric motor comprises two or more units, each including a permanent magnet field device mounted to rotate relatively to a wound armature having coils producing the same number of poles as the field device but located in a second number of equally spaced slots, the units being mounted with their permanent field devices mechanically connected together and their armatures mechanically connected together in such relative positions that the relative positions of the armature slots in relation to the poles of the permanent magnet field device of different motor units differ by an angle substantially equal to the slot pitch divided by the number of motor units, so that their cogging torques substantially cancel out. The second number of slots is a multiple of the number of poles of the wound armature.

Thus with two motor units the offset will be half the slot pitch, whereas with three motor units it will be one third of the slot pitch.

Thus the relative positions of the parts will generally be such that the relative positions at which different units exert maximum torque (at a given current) differ by an angle equal to the slot pitch divided by the number of units, so that their cogging torques cancel out.

In practice if the motor units are of identical construction their rotors and stators may bear identifying marks which may be brought into alignment or to a given angular spacing, to ensure the desired relative positions.

While the invention is applicable to a continuously rotating stepping motor, it is particularly applicable to oscillating motors moving through a fraction of a revolution. The invention may be applied to a motor in which the permanent magnetic field device is stationary, forming a stator, and the sound armature moves, forming a rotor, particularly in the case of an oscillating motor moving through only a fraction of a revolution, in which case the coils may be supplied through flexible conductors. In a preferred form of the invention, however, the wound armature is the stator and the permanent magnet field device is the rotor.

In the case of a position control system, it will generally be important that the several units should never fight one another.

For example, a feedback signal from a feedback device sensing the angular position of the rotor may be compared with a command signal from an input device to produce an error signal which is amplified to provide the motor current to move the load until the feedback signal matches the command signal. If the command signal is zero the error signal will be the feedback signal and will restore the rotor to a position (which will be termed the zero datum position) in which the error signal, and hence the torque, is zero.

Conveniently in applying the present invention to such a system, the several motor units and their feedback systems are so arranged and connected that their zero datum positions are the same but their maximum torque positions (at constant current) differ by an angle equal to the slot pitch divided by the number of units.

It will be appreciated that the units working nominally in parallel serve the purpose of introducing redundancy and if this is in any event a requirement no additional measures are required in order to cancel out the cogging torque in accordance with the invention.

Figure 2:
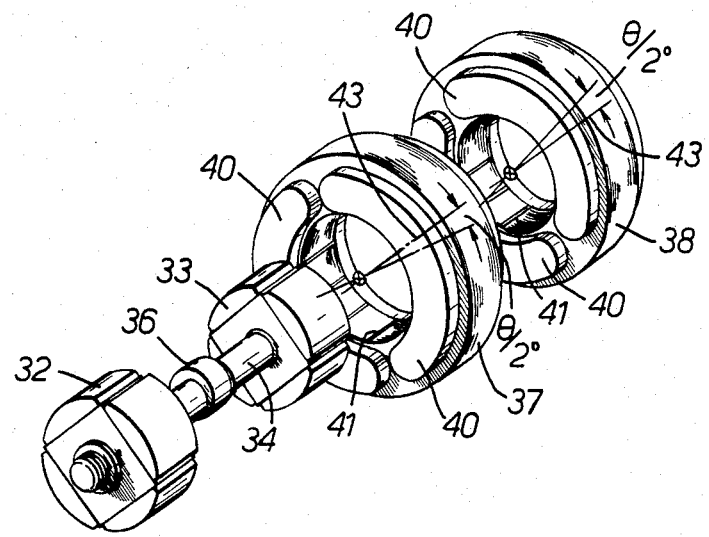

The invention may be applied to a wide range of motors but certain specific embodiments will be described by way of example, as applied to a direct drive D.C. motor employed as a servo-actuator, with reference to the accompanying drawings in which:

FIG. 1 shows a sectioned and exploded view of a hydraulic servo valve unit embodying a motor of the invention, FIG. 2 shows an exploded view of the motor unit of FIG. 1, and FIGS. 3, 4, 5 and 6 show graphs of operating parameters of the motor unit.

FIGS. 1 and 2 show in exploded and sectioned views an electrically operated hydraulic control valve. The control valve is of a reciprocating spool type actuated by an electric motor embodying the invention. The position of the spool of the valve is detected by a transducer to give an electrical signal representative of the position, so that the motor may be driven in a servo-control loop to position the valve to a desired operating position between two extremes.

It is a feature of motors of the present invention that they may be used to drive such a control valve directly through an eccentric or crank pin mechanism without the use of intermediate gearing while still obtaining smooth and close resolution in positioning the control valve.

The motor in FIGS. 1 and 2 comprises two units 30, 31 which are identical to one another and are mounted coaxially, with their rotors 32, 33 secured to a common shaft 34 for driving a load such as a spool valve 35, as through a crank or eccentric 36, and their stators 37, 38 secured to a suitable stationary support 39 so as to be adjustable about the axis of the shaft. Each rotor 32, 33 incorporates samarium cobalt permanent magnets in its outer surface and is surrounded by its corresponding stator ring carrying exciting coils 40 wound in slots 41. The current supplied to the motor is controlled by any convenient feedback mechanism operating in a closed loop. For example a feedback signal 44 from a feedback device, indicated schematically at 42, such as a potentiometer sensing the angular position of the rotor, may be compared in a comparator 45 with a demand signal 46 produced by an input device 47 to produce an error signal 48 which is amplified in amplifier 49 to provide the motor currents 50 to move the load until the feedback signal matches the demand signal.

In another arrangement of an electrically actuated servo spool mounted to move longitudinally in a casing to control ports and affording a pair of coaxial opposed flanges; two or more electric actuating motor units are spaced round the valve axis with their axes perpendicular to the valve axis and each has an output shaft movable through an angle about its axis and carrying at one end a crank having a crank pin fitting between the flanges to form a direct pin and slot connection between the motor shaft and the valve spool.

In the accompanying drawings, FIGS. 3 to 6, are diagrammatic graphs illustrating the variation of torque under different conditions in motor units.

Figure 3:
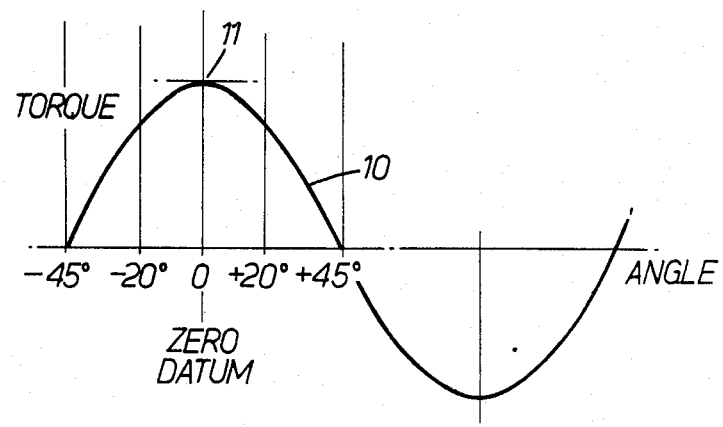

FIG. 3 is a graph showing the sinusoidal curve 10 of torque at constant current against angular movement for a single motor unit. For a four pole motor unit, it will be seen that from a maximum value 11 taken as zero angle the torque remains positive from −45° to +45°. Moreover if the limits of angular movement are, say, −20° to +20° the variation is relatively small and the torque may be regarded as varying solely with current.

Figure 4:
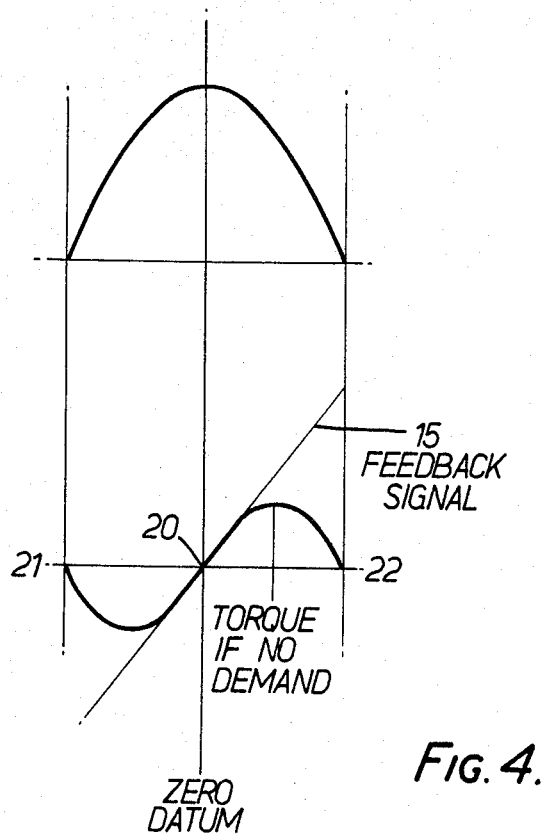

As indicated in FIG. 4, the feedback signal varies with angle, for example linearly, at 15. Accordingly the actual torque if the demand were zero would change sign at a point 20 that will be referred to as the zero datum, as well as returning to zero at 21 at an angle of −45° and +45° at 22.

Figure 5:
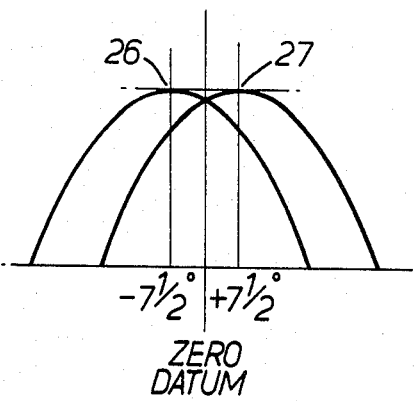

FIG. 5 shows the effect of the present invention. With 12 slots and two motor units, the offset must be 15° and it is desirable to divide this equally so that the torque maxima are at $-7\frac{1}{2}°$ at 26 and $+7\frac{1}{2}°$ at 27 from the zero datum position. This enables the torque of both motor units to be kept positive throughout the range from −20° to +20° from the zero datum.

Figure 6:
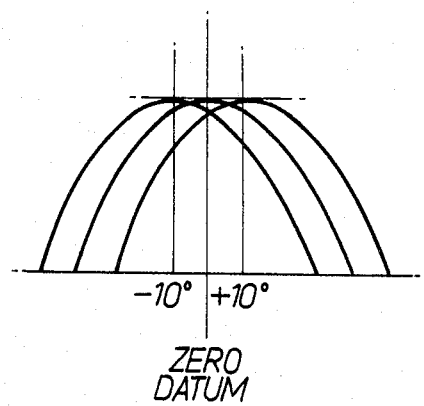

FIG. 6 is a graph similar to FIG. 5 showing the curves for three motor units.

It is important that, within the control exercised by the closed loop operation, a high accuracy of positioning ability and good resolution are achieved. The effect of cogging is to make the achievement of loop stability and good resolution more difficult.

In the particular arrangement, only a limited angle of rotation is required, for example plus or minus 20°, in which case there is no necessity for commutation and the torque is proportional to the coil current. In the case of a four pole motor, the torque varies from a maximum value to zero over an angle of 45° and within an angle of plus or minus 20° is substantially constant with angle and controlled only by the applied current.

As each rotor turns, its outer face, which carries the permanent magnets, passes over the slots in the stator one after another. As indicated above, this provides an oscillating component of reluctance in the magnetic circuit, and produces an alternating cogging torque superimposed on any torque due to the energization of the coil. This is a disturbing load which has to be overcome by the applied torque arising from the current in the coils.

To overcome this problem in accordance with the present invention, the two units of the motor are arranged so that the rotor positions at which different units would exert maximum torque (at constant current) differ by an angle equal to the slot pitch divided by the number of units, in this case half the slot pitch. The result is that when the instantaneous value of the cogging torque of one unit is positive that of the other unit will be equal to it, but negative so that the cogging torques will cancel out. In FIG. 2, this is illustrated schematically with a datum radical 43 being indicated for each wound stator, and an angular displacement $\theta/2$ being indicated for the slots 41 of each stator, where $\theta = 360/2S$, where S is the number of slots 41 in the stator.

I claim:

1. An electric D.C. motor comprising two or more units each including a permanent magnet field device mounted to move angularly through a limited angle of rotation only relatively to a wound armature having coils for producing, when energized by a direct current, the same number of poles as the field, but located in a second number of equally spaced slots equal to an integral multiple of the number of poles, the wound armatures of all of said units being connected for simultaneous energization by a direct current in accordance with a demand signal, the units being mounted with the permanent field devices mechanically connected together in such relative position that the relative positions of the armature slots in relation to the poles of the permanent magnet field device of different motor units differs by an angle substantially equal to the slot pitch divided by the number of motor units so that their cogging torques substantially cancel out.

2. An electric D.C. motor comprising two or more units each including a permanent magnet field device mounted to move angularly through a limited angle of rotation only, relatively to a wound armature having coils for producing, when energized by a direct current, the same number of poles as the field, but located in a second number of equally spaced slots equal to an integral multiple of the number of poles, the units being mounted with the permanent field devices mechanically connected together and their armatures mechanically connected together in such relative positions that the relative positions of the armature slots in relation to the poles of the permanent magnet field device of different motor units differs by an angle substantially equal to the slot pitch divided by the number of motor units so that their cogging torques substantially cancel out.

3. An electric motor as claimed in claim 2 including means providing a D.C. demand signal from which the motor current is derived for producing torque.

4. An electric motor as claimed in claim 2 including means providing a D.C. demand signal from which a motor current is derived for producing torque proportional to that current.

* * * * *